(12) United States Patent
Brooks et al.

(10) Patent No.: US 10,107,977 B2
(45) Date of Patent: Oct. 23, 2018

(54) OPTO-ELECTRONIC TRANSCEIVER HAVING HOUSING WITH SMALL FORM FACTOR

(75) Inventors: David Brooks, Hod Hasharon (IL); Eli Arad, Hod Hasharon (IL)

(73) Assignee: COLORCHIP (ISRAEL) LTD., Yokneam (IL)

( * ) Notice: Subject to any disclaimer, the term of this patent is extended or adjusted under 35 U.S.C. 154(b) by 0 days.

(21) Appl. No.: 13/636,690

(22) PCT Filed: Mar. 22, 2011

(86) PCT No.: PCT/IB2011/051189
§ 371 (c)(1),
(2), (4) Date: Oct. 9, 2012

(87) PCT Pub. No.: WO2011/117808
PCT Pub. Date: Sep. 29, 2011

(65) Prior Publication Data
US 2013/0039662 A1    Feb. 14, 2013

Related U.S. Application Data

(60) Provisional application No. 61/316,155, filed on Mar. 22, 2010.

(51) Int. Cl.
*H04B 10/00*    (2013.01)
*G02B 6/42*    (2006.01)
(Continued)

(52) U.S. Cl.
CPC ....... *G02B 6/4246* (2013.01); *G02B 6/12007* (2013.01); *G02B 6/42* (2013.01);
(Continued)

(58) Field of Classification Search
CPC .......................................... H04B 10/40–10/43
(Continued)

(56) References Cited

U.S. PATENT DOCUMENTS

| | | | | |
|---|---|---|---|---|
| 5,347,601 A | * | 9/1994 | Ade | G02B 6/12004 385/14 |
| 5,764,826 A | * | 6/1998 | Kuhara | G02B 6/421 250/227.11 |

(Continued)

FOREIGN PATENT DOCUMENTS

WO    2006054302    5/2006

OTHER PUBLICATIONS

INF-8438i Specification for QSFP (Quad Small Formfactor Pluggable) Transceiver, Rev 1.0 Nov. 2006, SFF Committee.*
(Continued)

*Primary Examiner* — Agustin Bello
(74) *Attorney, Agent, or Firm* — A. C. Entis-IP Ltd.; Allan C. Entis; Kenichi N. Hartman

(57) ABSTRACT

An optical transceiver comprising: an optical transmitter having plurality of light sources controllable to generate optical signals in different optical channels, an output aperture, an optical multiplexer that multiplexes optical signals generated by the light sources and transmits them to exit the transceiver from the output aperture; an optical receiver having a plurality of optical sensors, an input aperture for receiving optical signals in a plurality of optical channels, a demultiplexer that demultiplexes signals received at the input aperture, and directs signals received in different channels to different optical sensors of the plurality of optical sensors; and a QSFP compliant housing that houses the transmitter and receiver.

13 Claims, 5 Drawing Sheets

(51) Int. Cl.
*G02B 6/12* (2006.01)
*G02B 6/293* (2006.01)

(52) U.S. Cl.
CPC ........ *G02B 6/29355* (2013.01); *G02B 6/4214* (2013.01); *G02B 6/4215* (2013.01)

(58) Field of Classification Search
USPC .............................. 398/135–139; 385/88–94
See application file for complete search history.

(56) References Cited

U.S. PATENT DOCUMENTS

| | | | | |
|---|---|---|---|---|
| 5,835,646 A * | 11/1998 | Yoshimura | ............. | G02B 6/262 385/134 |
| 5,854,867 A * | 12/1998 | Lee | ............. | G02B 6/4214 385/49 |
| 6,215,917 B1 * | 4/2001 | Takahashi | ............. | H04B 10/40 385/14 |
| 6,222,967 B1 * | 4/2001 | Amano | ............. | G02B 6/30 385/49 |
| 6,316,281 B1 * | 11/2001 | Lee | ............. | G02B 6/136 385/14 |
| 6,441,937 B1 * | 8/2002 | Baur | ............. | H04B 10/40 398/135 |
| 6,480,642 B1 * | 11/2002 | Kawashima | ............. | G02B 6/12004 385/14 |
| 6,507,680 B1 * | 1/2003 | Nishimura | ............. | G02B 6/12019 385/14 |
| 6,580,850 B1 * | 6/2003 | Kazarinov | ............. | G02B 6/12004 385/16 |
| 6,690,873 B2 * | 2/2004 | Bendett | ............. | C03C 4/00 372/102 |
| 6,748,143 B2 * | 6/2004 | Kuhara | ............. | G02B 6/4246 385/49 |
| 7,203,426 B2 * | 4/2007 | Wu | ............. | G02B 6/4246 359/199.1 |
| 7,228,022 B1 * | 6/2007 | Bramson | ............. | G02B 6/126 385/12 |
| 7,826,690 B2 * | 11/2010 | Nakajima | ............. | G02F 1/0955 385/6 |
| 8,053,667 B2 * | 11/2011 | Chen | ............. | H05K 9/0058 174/50 |
| 8,509,624 B2 * | 8/2013 | Mattahedin | ............. | H04B 10/40 398/12 |
| 8,684,612 B2 * | 4/2014 | Kim | ............. | 385/15 |
| 8,758,065 B2 * | 6/2014 | Fransen | ............. | H01R 4/2445 439/217 |
| 2002/0067892 A1 * | 6/2002 | Oguro | ............. | G02B 6/12004 385/49 |
| 2003/0007734 A1 * | 1/2003 | Koshi | ............. | G02B 6/29355 385/42 |
| 2003/0161583 A1 * | 8/2003 | Kuhara | ............. | G02B 6/12007 385/49 |
| 2003/0210866 A1 * | 11/2003 | Kuhara | ............. | G02B 6/4246 385/49 |
| 2004/0105611 A1 * | 6/2004 | Bischel | ............. | G02B 6/4201 385/14 |
| 2005/0276539 A1 | 12/2005 | Fukuda | | |
| 2006/0251426 A1 * | 11/2006 | Mazed | ............. | H04B 10/40 398/164 |
| 2006/0274999 A1 * | 12/2006 | Wu | ............. | G02B 6/4246 385/92 |
| 2007/0280605 A1 * | 12/2007 | Mendoza | ............. | G01D 5/35383 385/92 |
| 2008/0044141 A1 * | 2/2008 | Willis | ............. | G02B 6/3887 385/88 |
| 2008/0095541 A1 | 4/2008 | Dallesasse | | |
| 2009/0034983 A1 * | 2/2009 | Shinoda | ............. | G02B 6/4246 398/141 |
| 2009/0087145 A1 * | 4/2009 | Rolston | ............. | G02B 6/4214 385/52 |
| 2009/0110393 A1 * | 4/2009 | Nara | ............. | G02B 6/12007 398/45 |
| 2009/0136234 A1 * | 5/2009 | Mottahedin | ............. | H04B 10/40 398/135 |
| 2009/0317086 A1 * | 12/2009 | Morohashi | ............. | H04B 10/40 398/135 |
| 2010/0018738 A1 * | 1/2010 | Chen | ............. | H05K 9/0058 174/51 |
| 2011/0206380 A1 * | 8/2011 | Ledentsov | ............. | H04B 10/40 398/116 |
| 2011/0217045 A1 * | 9/2011 | Watson | ............. | G02B 6/12002 398/79 |
| 2011/0243556 A1 * | 10/2011 | Nagarajan | ............. | H04B 10/40 398/43 |
| 2012/0058670 A1 * | 3/2012 | Regnier | ............. | H01R 13/65802 439/485 |
| 2013/0039662 A1 * | 2/2013 | Brooks | ............. | G02B 6/12007 398/91 |
| 2013/0051808 A1 * | 2/2013 | Kucharski | ............. | H03H 11/48 398/135 |
| 2013/0108274 A1 * | 5/2013 | Zhang | ............. | H04B 10/40 398/82 |
| 2014/0056594 A1 * | 2/2014 | Ding | ............. | H04J 14/0282 398/136 |

OTHER PUBLICATIONS

Approaching the Zettabyte Era; Cisco Visual Networking Index; Jun. 16, 2008.
International Search Report and Written Opinion, dated Aug. 4, 2011; Application No. PCT/IB/051189; Filing date: Mar. 22, 2011; Applicant: Colorchip Ltd.
Chinese Office Action dated Jul. 14, 2014 from corresponding Chinese application 201180023211.1.

* cited by examiner

OPTO-ELECTRONIC TRANSCEIVER HAVING HOUSING WITH SMALL FORM FACTOR

RELATED APPLICATIONS

The present application is a U.S. National Phase of PCT Application No. PCT/IB2011/051189, filed Mar. 22, 2011, which claims benefit under 35 U.S.C. § 119(e) of U.S. Provisional Application 61/316,155 filed on Mar. 22, 2010, the disclosure of which is incorporated herein by reference.

TECHNICAL FIELD

Embodiments of the invention relate to providing small optical receivers, transmitters and transceivers that support high data transmission rates for telecommunications and data communications.

BACKGROUND

The amount of information transferred over the various local and global communications networks is growing at a staggering rate. A recent white paper published in 2008 by Cisco Systems Inc. entitled "Approaching the Zettabyte Era" predicts that global IP traffic will increase from about 10 exabytes per month in 2008 to over 40 exabytes per month in 2012. The rapid increase in global communication traffic has generated a need for faster and smaller communications components.

In November 2006 a group of leading communications companies promulgated a specification for a physically small optical transceiver capable of supporting data transfer rates of up to 40 Gbits per second. The latest update of the specification was issued in March 2009.

The specification defines an optical transceiver, comprising four independent optical transmit channels and four independent optical receive channels. Each transmit channel is required to be capable of transmitting data at up to 10 gigabits per second (Gbps). The specified transceiver is configured to multiplex the data from the four independent transmit channels and transmit the multiplexed data over a single mode fiber (SMF), hereinafter a "transmit fiber", for a total aggregated transceiver transmission data rate of 40 Gbps. Each receive channel is required to be capable of receiving data at up to 10 gigabits per second (Gbps) for a total aggregated transceiver receive data rate of 40 Gbps. The transceiver is configured to receive data over a single SMF "receiver fiber" and demultiplex the received data to the four receive channels. The specified transceiver is designed to replace four standard SFP transceivers and occupy a space of only about 30% more than one of the standard SFP transceivers. It is referred to as a "Quad Small Form-factor Pluggable" optical module, and is commonly referred to by its acronym "QSFP".

SUMMARY

An embodiment of the invention relates to providing a small optical receiving module comprising a Planar Lightwave Circuit (PLC) for receiving optical signals transmitted in a plurality of different optical channels over a single optical fiber, demultiplexing the signals, and generating electrical signals responsive to the demultiplexed signals.

In accordance with an embodiment of the invention, the PLC comprises an optical filter, optionally a thin film filter (TFF), optically coupled to an output port of a Mach Zehnder Interferometer (MZI) for each optical channel for demultiplexing optical signals received by the receiving module to the optical channel. An optical sensor, optionally a photodiode (PD), is coupled to the channel's TFF and generates electrical signals responsive to the optical signals demultiplexed to the channel. The receiving optical module is also referred to as a Receiving Optical Sub-Assembly (ROSA)

An embodiment of the invention relates to providing a small optical transmitting module comprising a Planar Lightwave Circuit (PLC) for generating optical signals in a plurality of different optical channels and multiplexing the signals for transmission over a single optical fiber. In accordance with an embodiment of the invention, for each optical channel the module comprises a light source coupled to an input port of an MZI for generating optical signals in the channel and multiplexing the generated signals. Optionally the light source comprises a laser diode. Optionally the laser diode is a coarse wavelength division multiplexing (CWDM) distributed feedback (DFB) laser diode. The transmitting module is also referred to as a transmitting optical sub-assembly (TOSA).

An aspect of some embodiments of the invention, relate to providing a QSFP transceiver comprising a ROSA, i.e. a receiving optical sub-assembly, and a TOSA, i.e. a transmitting optical subassembly, in accordance with embodiments of the invention.

There is therefore provided in accordance with an embodiment of the invention an optical transceiver comprising: an optical transmitter having, a plurality of light sources controllable to generate optical signals in different optical channels, an output aperture, and an optical multiplexer that multiplexes optical signals generated by the light sources and transmits them to exit the transceiver from the output aperture; an optical receiver having, a plurality of optical sensors, an input aperture for receiving optical signals in a plurality of optical channels, a demultiplexer that demultiplexes signals received at the input aperture and directs signals received in different channels to different optical sensors of the plurality of optical sensors; and a QSFP compliant housing that houses the transmitter and receiver. Optionally, each optical sensor is shielded by a thin film filter that transmits light in one of the plurality of optical channels and blocks light in the other of the plurality of optical channels. Additionally or alternatively, the receiver comprises a planar light circuit (PLC).

In an embodiment, the receiver comprises a planar light circuit (PLC). Optionally, the transmitter comprises a PLC. Optionally, the transmitter PLC and the receiver PLC are positioned adjacent each other. Optionally, the transceiver comprises a conducting panel located between the transmitter and receiver PLCs. Optionally, the transmitter and receiver PLCs are substantially coplanar. Optionally, the transmitter and receiver PLCs are mounted to a same planar support base.

In an embodiment of the invention, the transmitter and receiver PLCs are integrally formed on a same substrate. Optionally, the substrate comprises a glass.

In an embodiment of the invention, the multiplexer comprises a Mach Zehnder Interferometer (MZI). Optionally, the multiplexer comprises a cascade of at least three MZIs.

In an embodiment of the invention, the demultiplexer comprises a Mach Zehnder Interferometer (MZI). Optionally, the demultiplexer comprises a cascade of at least three MZIs.

There is further provided in accordance with an embodiment of the invention, a receiving optical module for demultiplexing optical signals, the module comprising: a planar optical substrate having an input aperture for receiving optical signals in each of a plurality of different optical channels; at least one Mach-Zehnder interferometer formed in the optical substrate and comprising an entry waveguide that receives optical signals that enter the module via the input aperture, and first and second exit waveguides via which received optical signals in different optical channels of the plurality of optical channels exit the interferometer; and a different optical sensor for each exit waveguide that receives optical signals that exit the interferometer via the exit waveguide. Optionally, each optical sensor is shielded by a thin film filter that transmits light in one of the plurality of optical channels and blocks light in the other of the plurality of optical channels.

There is further provided in accordance with an embodiment of the invention, a transmitting optical module for multiplexing and transmitting optical signals, the module comprising: a planar optical substrate having an output aperture for transmitting optical signals; at least one Mach-Zehnder interferometer formed in the optical substrate comprising an exit waveguide optically coupled to the output aperture and first and second entry waveguides; and different light sources optically coupled to the substrate that generate optical signals in different optical channels that are received by the interferometer in different entry waveguides, which optical signals exit the interferometer via the exit waveguide.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
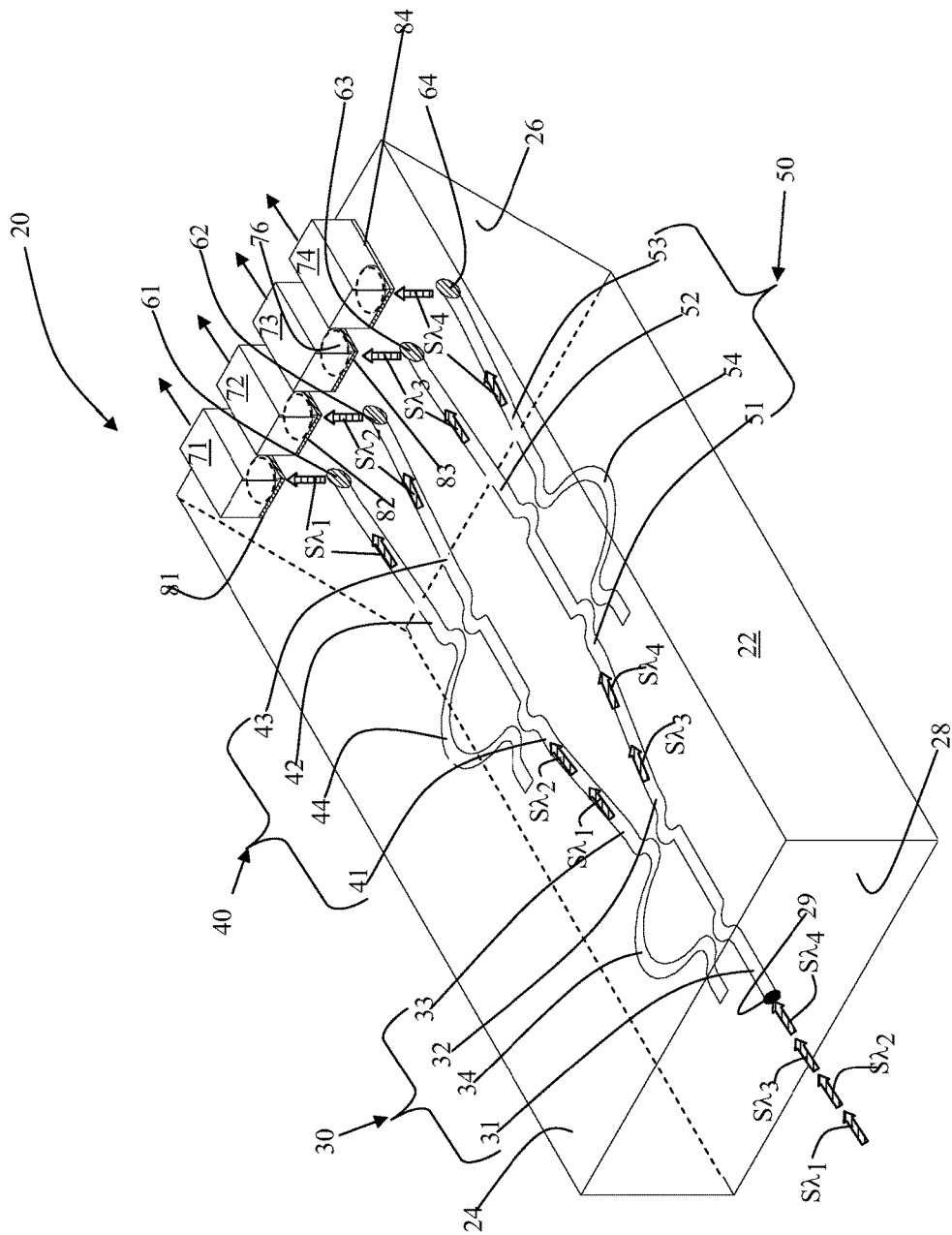
FIG. 1 schematically shows a ROSA, in accordance with an embodiment of the invention.

FIG. 1 schematically shows a ROSA 20 in accordance with an embodiment of the invention. ROSA 20 is configured to receive optical signals in a plurality of optionally four different optical channels defined respectively by four different wavelength bands, demultiplex the optical signals and generate electrical signals for each channel responsive to the demultiplexed optical signals. The optical channels and the wavelength bands that define the channels are identified and referred to by wavelength symbols $\lambda_1$, $\lambda_2$, $\lambda_3$, or $\lambda_4$. Optical signals in channels $\lambda_1$, $\lambda_2$, $\lambda_3$, or $\lambda_4$ are represented by shaded block arrows labeled respectively by $S\lambda_1$, $S\lambda_2$, $S\lambda_3$, or $S\lambda_4$.

A process by which ROSA demultiplexes optical signals and generates electrical signals for demultiplexed optical signals for each channel, in accordance with an embodiment of the invention, is discussed below following description of the architecture of ROSA 20. In FIG. 1 ROSA is schematically shown processing signals in the four channels.

ROSA 20 comprises an optical substrate 22 optionally formed in the shape of a rectangular plate having top a surface 24 and an "entry surface" 28 optionally perpendicular to surface 24. A second "reflecting surface" 26, opposite entry surface 28, is optionally oriented at 45° relative to the top face surface and is formed so that it reflects light in the optical channels for which ROSA 20 is designed to demultiplex optical signals. An input aperture 20 for receiving optical signals is located on entry surface 28. Edges of substrate 22 that are normally not seen in the perspective of FIG. 1 are shown with dashed lines.

Substrate 22 comprises a first, "input" Mach-Zehnder Interferometer (MZI) 30 cascaded with second and third, "output" MZIs 40 and 50. Input MZI 30 comprises an entry waveguide 31, exit waveguides 32, and 33 and a delay waveguide 34. Input waveguide 31 intersects first surface 28 and the intersection forms input aperture 29. Exit waveguides 32 and 33 of input MZI 30 are connected respectively with input waveguides 41 and 51 of output MZIs 40 and 50 respectively. Output MZI 40 has exit waveguides 42 and 43 that intersect reflecting surface 26 at reflecting apertures 61, and 62 respectively. Output MZI 50 has exit waveguides 52 and 53 that intersect reflecting surface 29 at reflecting apertures 63 and 64.

The component waveguides of MZIs 30, 40 and 50 are formed in substrate 22 using any of various methods and materials known in the art. Optionally, the waveguides are formed by an ion exchange process such as described in PCT Publication WO 2006/054302. In some embodiments of the invention substrate 22 and the waveguides are constructed in a photolithographic process, such as a CMOS process, using techniques and materials known in the art of fabricating semiconductor dies. Optionally, waveguides that are joined together, for example, exit waveguides 32 and input waveguide 41 are formed simultaneously as a single waveguide unitary waveguide.

Light propagating in an exit waveguide 42, 43, 52, or 53 that is incident on the reflecting aperture associated with the waveguide is reflected out of the waveguide towards top surface 24. Light sensors 71, 72, 73 and 74, optionally photodiodes (PDs), having light sensitive regions 76 are mounted on top surface 24 with their respective light sensitive regions aligned to receive light from exit waveguides 42, 43, 52, and 53 reflected by reflecting apertures 61, 62, 63 and 64 respectively. Optionally, each photodiode 71, 72, 73 and 74 is mounted to top surface 24 with an optical filter 81, 82, 83 and 84 located between its sensitive region 76 and the top surface. Optical filters 81, 82, 83 and 84 are relatively narrow band pass filters, such as thin film filters (TFFs), each of which transmits light in a different one of the four optical channels for which ROSA 20 demultiplexes light.

Operation of ROSA 20 is described with respect to an optical signal $S\lambda_1$, $S\lambda_2$, $S\lambda_3$, and $S\lambda_4$ in each of wavelength bands $\lambda_1$, $\lambda_2$, $\lambda_3$, or $\lambda_4$. Signals $S\lambda_1$, $S\lambda_2$, $S\lambda_3$, and $S\lambda_4$ are shown entering ROSA 20 and entry waveguide 31 of input MZI 30 through input aperture 29. Delay waveguide 34 of MZI 30 is configured to introduce a phase difference in optical signals that are coupled into and propagate in the delay waveguide so that optical signals $S\lambda_1$ and $S\lambda_2$ in optical channels $\lambda_1$, $\lambda_2$ that enter the MZI exit the MZI, as shown in the figure, via exit waveguide 33 and enter MZI 40. Optical signals $S\lambda_3$ and $S\lambda_4$ in optical channels $\lambda_3$ and $\lambda_4$ on the other hand exit input MZI via exit waveguide 34 and enter MZI 50. Delay waveguide 44 in MZI 40 that receives optical signals $S\lambda_1$ and $S\lambda_2$ is configured to separate the optical signals so that optical signals $S\lambda_1$ and $S\lambda_2$ leave the MZI via exit waveguides 43 and 43 respectively. The signals are respectively incident on reflecting apertures 61 and 62 and are reflected out of the waveguides by the reflecting apertures towards light sensitive regions 76 of PDs 71 and 72 respectively. After reflected signals $S\lambda_1$ and $S\lambda_2$ are filtered by passage through TFFs 81 and 82 respectively, PDs 71 and 72 generate electrical signals represented by arrows 91 and 92 responsive to the demultiplexed optical signals $S\lambda_1$ and $S\lambda_2$ that they receive.

Similarly optical signals $S\lambda_3$ and $S\lambda_4$ that exit MZI 30 are input to MZI 50, in which phase shift generated in optical signals propagating in delay waveguide 54 separates the signals so that they leave MZI 50 along waveguides 52 and 53 respectively. The exiting optical signals $S\lambda_3$ and $S\lambda_4$ are respectively incident on reflecting apertures 63 and 64, which reflect the signals respectively towards PDs 73 and 74. After signals $S\lambda_3$ and $S\lambda_4$ pass through and are filtered by TFFs 83 and 84, the signals are received respectively by PDs 73 and 74 which generate output electrical signals 93 and 94 responsive thereto.

Cascaded MZIs 30, 40 and 50 and band pass filters 81 . . . 84 operate in accordance with an embodiment of the invention to demultiplex optical signals in optical channels $\lambda_1$, $\lambda_2$, $\lambda_3$, or $\lambda_4$ with reduced cross talk between signals in the optical channels.

Figure 2A:
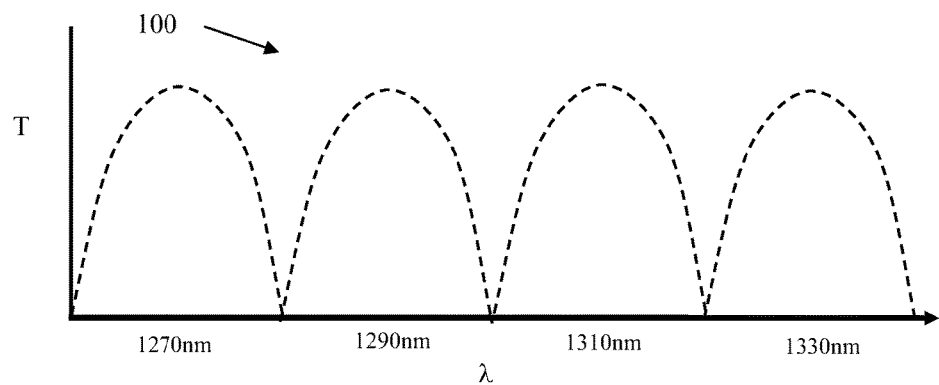
FIG. 2A shows a graph of transmittance for an array of cascaded MZIs comprised in a ROSA, in accordance with an embodiment of the invention.

By way of example, assume that wavelength bands $\lambda_1$, $\lambda_2$, $\lambda_3$, or $\lambda_4$ are CWDM wavelength bands (1270 nm-1610 nm) with channel spacing of 20 nm and central wavelengths 1270 nm, 1290 nm, 1310 nm and 1330 nm. If cascaded MZIs 30, 40 and 50 are properly tuned with appropriate phase shifts introduced by delay waveguides 34, 44 and 54, they will have transmittance as a function of wavelength similar to that shown in a graph 100 in FIG. 2A. Wavelength $\lambda$ is shown along an abscissa of the graph and transmittance "T" is shown in arbitrary units along an ordinate of the graph. Graph 100 shows that the cascaded MZIs have a relatively broad transmittance peak for each wavelength channel and that the peak decreases relatively slowly from a maximum transmittance at the central wavelength of the channel. As a result, optical signals in one optical channel adulterated with optical frequencies from an adjacent channel can often generate cross talk with the adjacent channel and influence electrical signals output by a PD 71, 72, 73 or 74 of the adjacent channel.

Figure 2B:
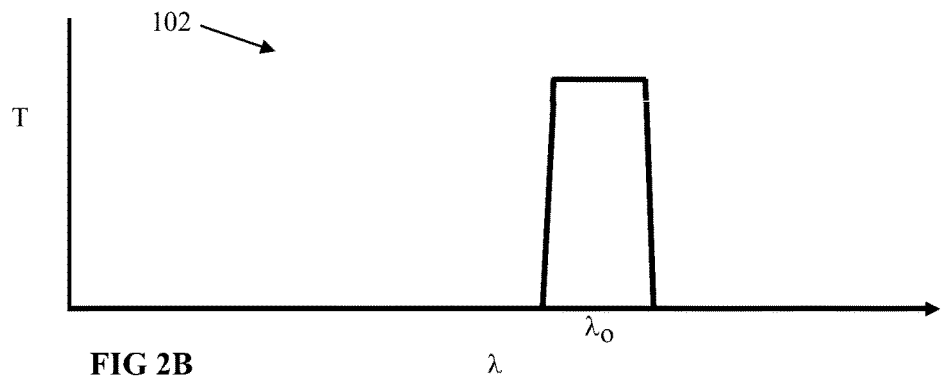
FIGS. 2B shows a graph of transmittance for a TFF comprised in a ROSA, in accordance with an embodiment of the invention.
Figure 2C:
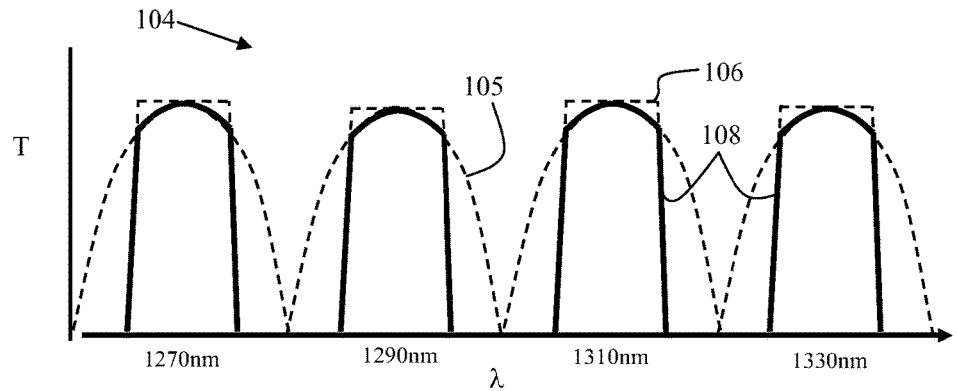
FIGS. 2C shows a graph of transmittance of a combination of MZIs and TFFs comprised in a ROSA, in accordance with an embodiment of the invention.

Addition of narrow band pass filters such as TFFs 81, 82, 83 and 84 in accordance with an embodiment of the invention as shown for ROSA 20 in FIG. 1 operate to reduce such cross talk. FIG. 2B shows a graph 102 of a typical transmittance curve as a function of frequency that can be realized for a TFF having a narrow band pass centered on an arbitrary frequency $\lambda_O$. FIG. 2C shows a graph 104 of transmittance as a function of wavelength for cascaded MZIs 20, 30 and 40 with the addition of narrow band pass TFFs 81, 82, 83 and 84 centered on wavelengths 1270 nm, 1290 nm, 1310 nm, and 1330 nm. In the figure dashed curves 105 and 106 represent component transmittances of the cascaded MZIs and the TFFs prior to being multiplied, which are shown in graphs 102 and 104 (FIGS. 2A and 2B) respectively. The bold solid curve 108 represents the combined transmittance of the cascaded MZIs and TFFs. The addition of the TFFs sharply separates the transmittance curve peaks for the optical channels processed by ROSA 20 and operates to reduce cross talk between the channels.

Figure 3:
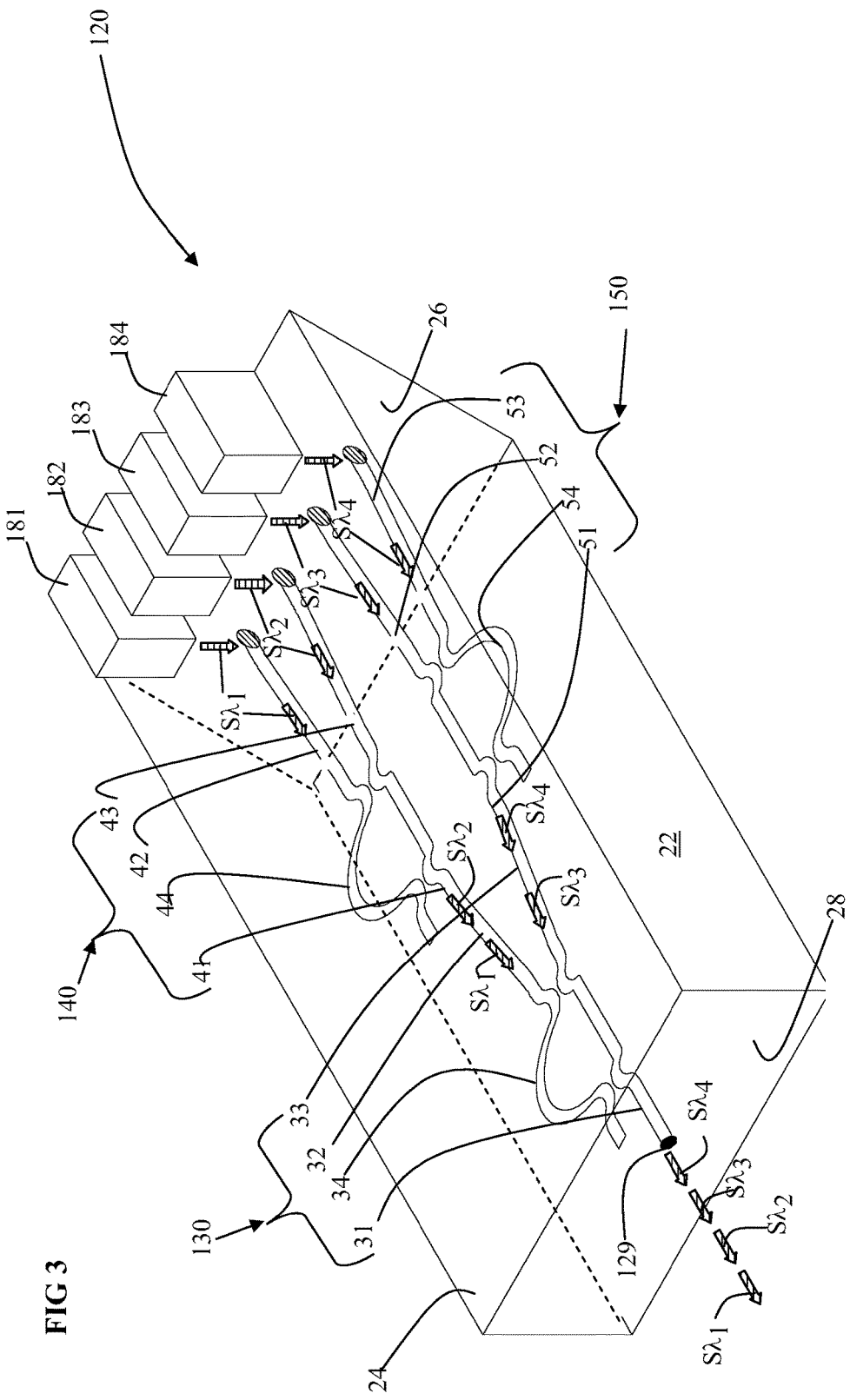
FIG. 3 schematically shows a TOSA, in accordance with an embodiment of the invention.

FIG. 3 schematically shows a TOSA 120, generating and multiplexing optical signals in a plurality of optionally four different optical channels in accordance with an embodiment of the invention.

TOSA 120 is similar to ROSA 20 and comprises an optical substrate 22 having a reflecting surface 26 and comprising cascaded MZIs 130, 140 and 150. Optionally, cascaded MZIs 130, 140 and 150 are identical to cascaded MZIs 30, 40 and 50 comprised in ROSA 20 shown in FIG. 1. However, TOSA 120 comprises laser diodes, optionally distributed feedback (DFB) laser diodes (LDs), 181, 182, 183 and 184, for generating optical signals in place of PDs 71, 72, 73 and 74 and their associated TFFs comprised in ROSA 20. In addition, cascaded MZIs 130, 140 and 150 in TOSA 120 operate in "reverse" to multiplex signals rather than demultiplex signals. Waveguides 31, 41, and 51, referred to as entry waveguides in the discussion of ROSA 20 function as exit waveguides in TOSA 120. And waveguides 32, 33, 42, 43, 52, and 53 referred to as exit waveguides in the discussion of ROSA 20, function as entry waveguides in TOSA 120. Waveguide 31 intersects surface 28 to form an output aperture 129 on the surface for the TOSA.

In operation of TOSA 120, each laser diode 181, 182, 183, and 184 is controlled to respectively generate optical signals $S\lambda_1$, $S\lambda_2$, $S\lambda_3$, and $S\lambda_4$ as required in each of optical channels $\lambda_1$, $\lambda_2$, $\lambda_3$, or $\lambda_4$. The optical signals, as shown in FIG. 3, are transmitted into substrate 22 so that they are reflected respectively by reflection apertures 61, 62, 63, and 64 into waveguides 42, 43, 52, and 53 respectively. Optical signals $S\lambda_1$ and $S\lambda_2$, generated by LDs 181 and 182 are reflected respectively by reflecting apertures 61 and 62 into waveguides 42 and 43 of MZI 140, which multiplexes the signal and transfers them to MZI 120 via waveguide 41. Similarly, optical signals $S\lambda_3$ and $S\lambda_4$, generated by LDs 183 and 184 are reflected by reflecting apertures 63 and 64 into waveguides 52 and 53 of MZI 150. MZI 150 multiplexes the optical signals it receives and transfers them to MZI 130 via waveguide 51. MZI 130 multiplexes optical signals $S\lambda_1$, $S\lambda_4$, $S\lambda_3$, and $S\lambda_4$ it receives and transmits them via waveguide 31 to output aperture 129.

Figure 4:
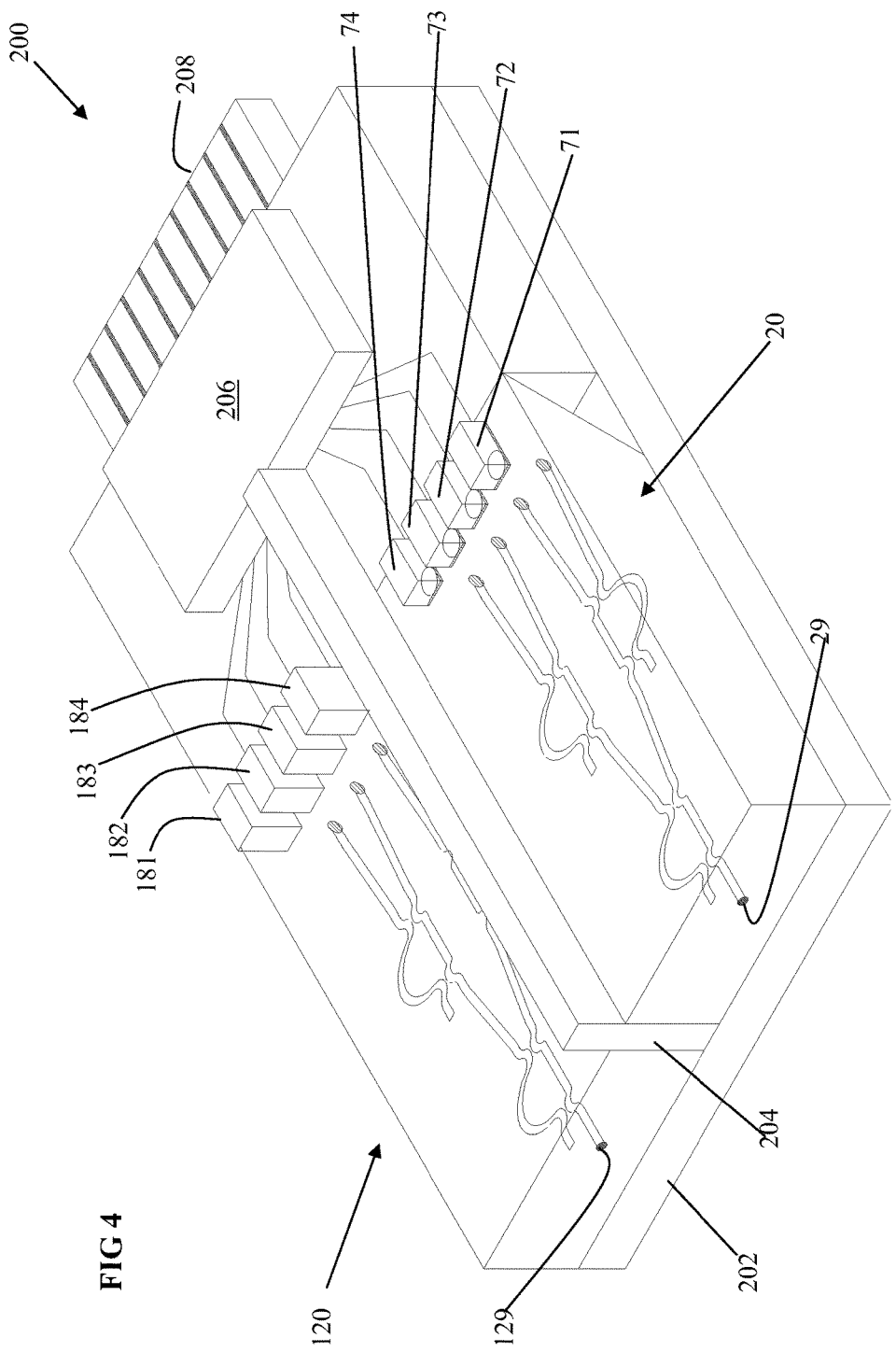
FIG. 4 schematically shows a QSFP transceiver comprising the ROSA and TOSA shown in FIG. 1 and FIG. 2 respectively in accordance with an embodiment of the invention.

ROSA and TOSA 20 and 120 can be configured and produced sufficiently small so that they can be used in a QSFP transceiver, in accordance with an embodiment of the invention. FIG. 4 schematically shows a QSFP 200 comprising ROSA 20 and TOSA 120, in accordance with an embodiment of the invention.

ROSA and TOSA 20 and 120 are optionally mounted to a support base 202 having a conducting panel 204 located between them to reduce mutual electromagnetic interference. A microcontroller 206, is mounted to support base 202, and is connected to LDs 181, 182, 183 and 184 of TOSA 120 to control generation of optical signals by the LDs in each of optical channels $\lambda_1$, $\lambda_2$, $\lambda_3$, or $\lambda_4$ for multiplexing and transmission through output aperture 129. Optionally microcontroller 206 is coupled to each of the LDs by a different laser diode driver (LDD, not shown) that controls current to the LD, and thereby light pulses generated by the LD. The microcontroller is also connected to PDs 71, 72, 73 and 74 comprised in ROSA 20 to receive electrical signals generated by the PDs responsive to optical signals received by QSFP transceiver 200 via input aperture 29 that the ROSA demultiplexes. Optionally, microcontroller 206 is coupled to each of the PDs by a different transimpedance amplifier/limiting amplifier (TIA/LIA, not shown) that receives current signals from the PD and converts it to a shaped voltage signal. A QSFP compliant connector 208 is electrically connected to microcontroller 206 for connecting QSFP 200 to a communication terminal. QSFP 200 is small enough to be housed in a QSFP compliant housing having length, width and height less than or equal to 70 mm, 18.35 mm and 8.5 mm.

Figure 5:
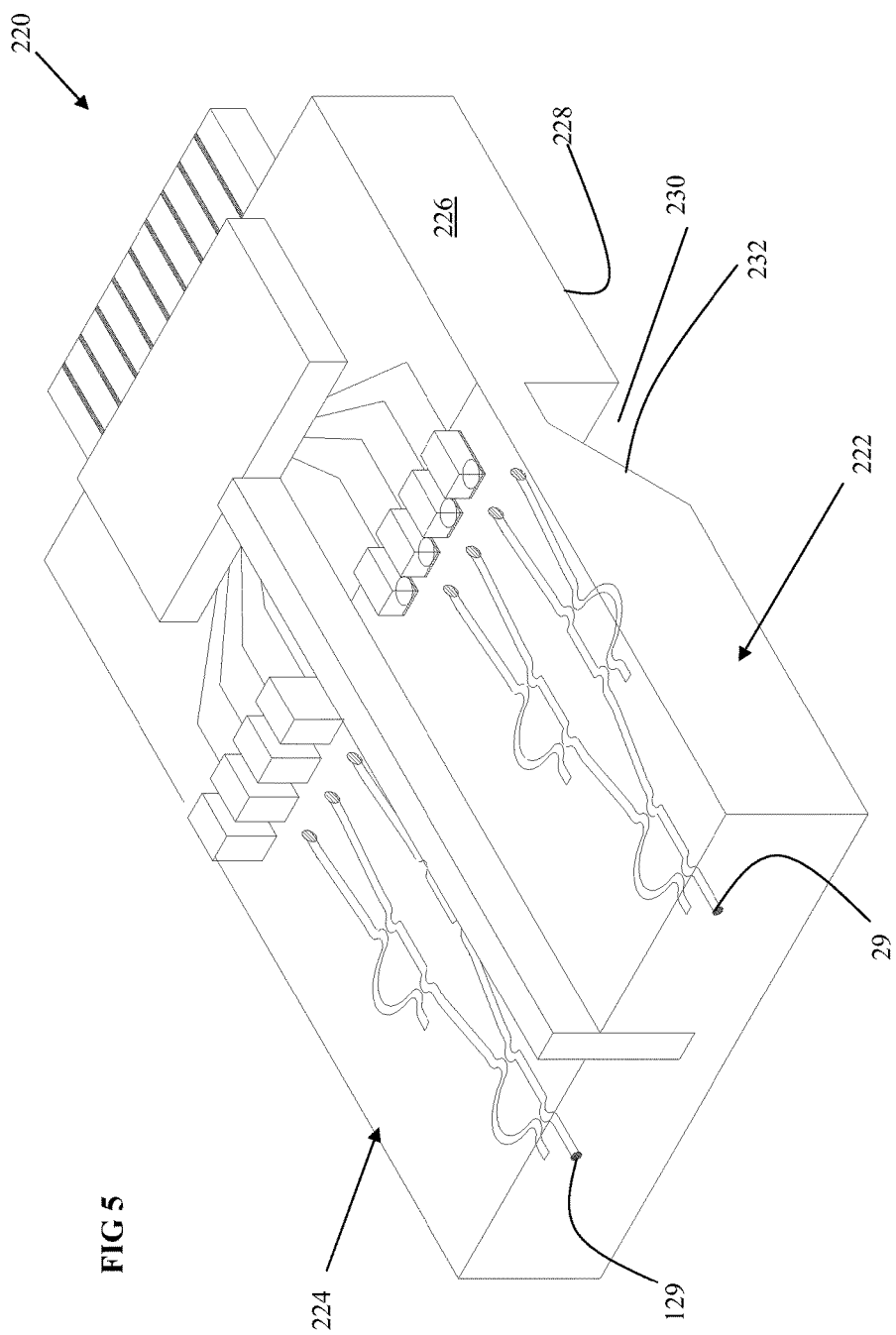
FIG. 5 schematically shows another QSFP, in accordance with an embodiment of the invention.

FIG. 5 schematically shows another QSFP 220 comprising a ROSA 222 and a TOSA 224, in accordance with an embodiment of the invention. ROSA 222 is similar to and optionally comprises the same components as ROSA 20. TOSA 224 is similar to and optionally comprises the same components as TOSA 120. However, unlike QSFP 200, in QSFP 220 the ROSA and TOSA (ROSA 222 and TOSA 224) are formed on a same glass substrate 226. A groove 230 formed in an underside surface 228 of substrate 226 has a reflecting surface 232 that functions in place of reflecting surfaces 26 in ROSA 20 and TOSA 120 (FIG. 1 and FIG. 3 respectively). Reflecting surface 232 reflects optical signals generated by LDs in TOSA 224 into the TOSA's cascaded MZIs for multiplexing and transmission from QSFP transceiver 220 via output aperture 129. The reflecting surface reflects optical signals that enter QSFP 220 via input aperture 29 and exit cascaded MZIs in ROSA 222 to PDs in the ROSA for generation of electrical signals responsive to the optical signals.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A QSFP optical transceiver comprising:
an optical transmitter having:
a plurality of light sources controllable to generate optical signals in four different optical channels,
an output aperture, and
an optical multiplexer that multiplexes optical signals generated by the light sources and transmits them to exit the transceiver from the output aperture;
an optical receiver having:
a plurality of optical sensors,
an input aperture for receiving optical signals in four optical channels,
a demultiplexer that demultiplexes signals received at the input aperture and directs signals received in the four optical channels to different optical sensors of the plurality of optical sensors, and
a plurality of band pass filters configured to intercept optical signals between the demultiplexer and a given optical sensor of the plurality of optical sensors, wherein each of the plurality of band pass filters transmits light in one of the plurality of optical channels, blocks light in the other of the plurality of optical channels and shields the given optical sensor for filtering demultiplexed optical signals directed to the given optical sensor, wherein the optical receiver is positioned adjacent to the optical transmitter; and
a QSFP compliant housing that houses the transmitter and receiver;
a conducting panel positioned and operable to reduce electromagnetic interference between the optical receiver and the optical transmitter.

2. An optical transceiver according to claim 1 wherein each of the plurality of band pass filters comprises a thin film filter.

3. An optical transceiver according to claim 1 wherein the receiver comprises a planar light circuit (PLC).

4. An optical transceiver according to claim 3 wherein the transmitter comprises a PLC.

5. An optical transceiver according to claim 4 wherein the transmitter and receiver PLCs are substantially coplanar.

6. An optical transceiver according to claim 5 wherein the transmitter and receiver PLCs are mounted to a same planar support base.

7. An optical transceiver according to claim 5 wherein the transmitter and receiver PLCs are integrally formed on a same substrate.

8. An optical transceiver according to claim 7 wherein the substrate comprises a glass.

9. An optical transceiver according to claim 1 wherein the multiplexer comprises a Mach Zehnder Interferometer (MZI).

10. An optical transceiver according to claim 9 wherein the multiplexer comprises a cascade of at least three MZIs.

11. An optical transceiver according to claim 1 wherein the demultiplexer comprises a MZI.

12. An optical transceiver according to claim 11 wherein the demultiplexer comprises a cascade of at least three MZIs.

13. An optical transceiver according to claim 1, wherein the QSFP compliant housing is characterized by a length, width and height less than or equal to 70mm, 18.35mm and 8.5mm.

* * * * *